March 12, 1935. H. G. CHRISTENSON 1,994,451
BATTERY CARRIER
Filed May 22, 1933
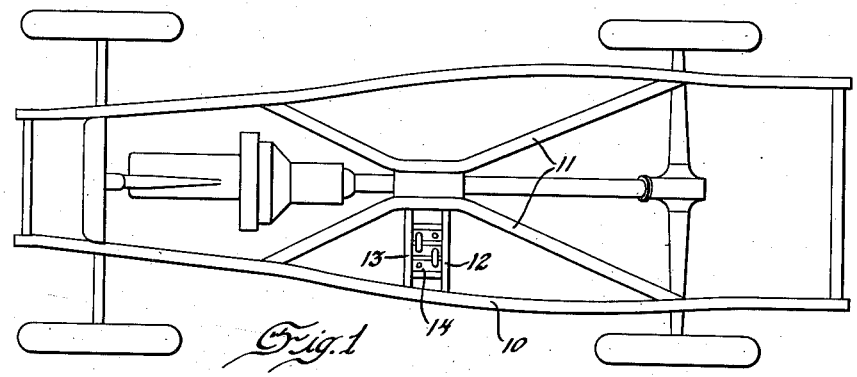
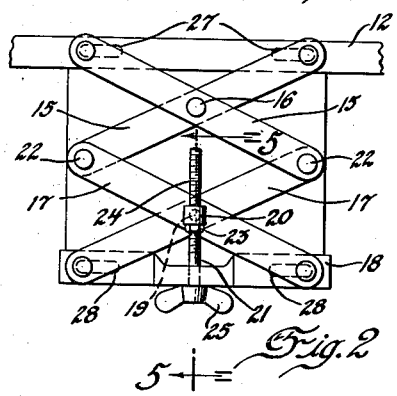
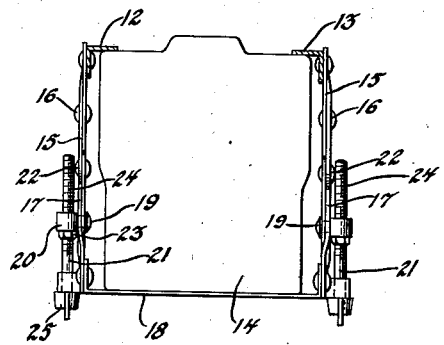
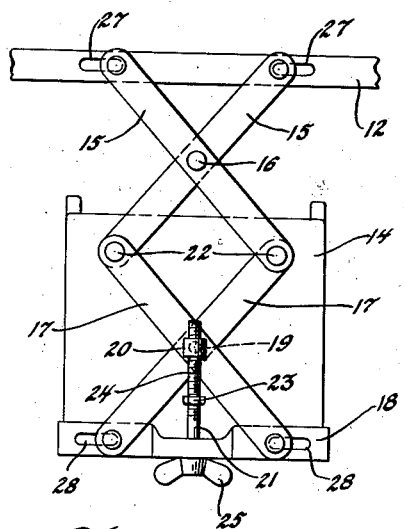
INVENTOR.
Helmer G. Christenson
BY Arthur M. Smith
ATTORNEY.

Patented Mar. 12, 1935

1,994,451

UNITED STATES PATENT OFFICE 1,994,451

BATTERY CARRIER

Helmer G. Christenson, Detroit, Mich.

Application May 22, 1933, Serial No. 672,217

6 Claims. (Cl. 180—68.5)

My invention relates to a battery carrier and more particularly to such a carrier adapted for universal use in motor vehicles or the like.

Prior to my invention storage batteries have been placed in a carrier secured to the frame of a motor vehicle. There was no uniformity of placement of such carriers in vehicles. In conventional practice, such carriers are placed under floor boards, under seats, and in other equally inaccessible places. Storage batteries require frequent servicing operations in order to secure the maximum life and service from the battery. The specific gravity of the acid must be checked and water must be added at frequent intervals. Where the battery is placed in the conventional inaccessible places, many operators of motor vehicles neglect this important service operation.

In addition, the conventional type of battery carrier is in the form of a metallic box and frequently is so manufactured and so placed that it is useful for but one particular type of battery. Variations in sizes and types of batteries are limited by such carriers to the size of the carrier. Frequently a motor vehicle is equipped with a smaller battery than is desirable for universal use and yet the operator of the vehicle must either use that type of battery or go to the extra expense of installing a suitable type of battery carrier. In conventional types of battery carriers there frequently is inadequate provision for holding the battery securely in place.

It is, therefore, an object of my present invention to provide a battery carrier adapted for universal use in motor vehicles or the like which is so secured to the frame of the vehicle that the battery carried therein may be serviced from beneath the vehicle without requiring the removal of floor boards, seats, etc.

It is a further object of my present invention to provide a battery carrier adapted for universal use in motor vehicles or the like, which will accommodate all sizes and types of storage batteries suitable for the particular installation and which will hold a battery in place therein by a clamping action exerted on the top and bottom of the sides of the battery.

It is a further object of my present invention to provide a battery carrier adapted for universal use in motor vehicles or the like, which is economical to manufacture and install and which may be used with a minimum amount of inconvenience to the person servicing the battery held therein.

These and various other objects, features of arrangement, construction and operation, are plainly shown and described and will be best understood by reference to the accompanying drawing, in which:

Fig. 1 is a top plan of a skeleton motor vehicle chassis showing the placement therein of a carrier embodying my invention;

Fig. 2 is a side elevation of a carrier embodying my invention;

Fig. 3 is an end view of a carrier embodying my invention showing placement of a battery therein;

Fig. 4 is a side elevation showing a carrier embodying my invention in the extended position to permit servicing of the battery held therein;

Fig. 5 is a sectional view taken on the line 5—5 of Fig. 2.

Similar reference numerals refer to similar parts throughout the several views.

Referring more in detail to the drawing and particularly to Fig. 1, 10 designates the frame of a conventional type of motor vehicle chassis, having a plurality of cross members 11. Secured to one side of the frame 10 and to one of the cross members 11, are parallel battery carrier supporting members 12 and 13. A battery 14 is shown in place between said supporting members 12 and 13.

A battery carrier embodying my invention is shown in the remaining figures of the drawing and consists of two sides, each comprising a plurality of members 15 adapted for pivotal attachment at one end to either the supporting member 12 or the supporting member 13. The members 15 also are connected at a point 16 by a rivet or suitable means, in such a manner as to be maintained in the shape of an X.

A plurality of members 17 are pivotally secured at one end to a bottom plate 18 and are crossed at a point 19, through which extends a portion of a screw-threaded member 20, which permits pivotal movement of the members 17 about the point 19 while maintaining the members in the shape of an X. The ends of the members 15 opposite the ends secured to the supporting members 12 or 13 are pivotally secured by rivets 22 or similar means to the ends of the members 17 opposite the ends secured to the bottom plate 18.

A bolt 21 is provided for each of the sides of a carrier embodying my invention. One of these bolts 21 is shown in detail in connection with other parts of the assembly in Fig. 5. As here shown, the screw-threaded member 20 is placed in such a position as to be engaged by the shank of the bolt 21 and is provided with an extending portion which extends through the point 19 and permits pivotal movement of the members 17 about this point. A lock nut 23 is screw-threaded on the bolt 21 and provides a stop limiting the travel of the bolt 21 relative to the member 19.

In order to permit a sliding movement as well as a pivotal movement of the members 15 and 17 relative to the supporting members 12 or 13 and the bottom plate 18 respectively, I provide a plurality of elongated slots 27 in the supporting members and a plurality of elongated slots 28 in the bottom plate 18 at the respective points of pivotal attachment thereto of the members 15 and the members 17.

The operation of a device embodying my invention is as follows:

When the battery 14 is held in position for operation of the motor vehicle, the parts occupy the relative positions shown in Figs. 2 and 3. When in this position, the bolts 21 are so screwed into position that the battery 14 is clamped in place by contact of its sides with the bottom plate 18 and the supporting members 12 and 13. The connections of the members 15 and 17 are such that the movement of the bolts 21 is translated through a train of levers formed by the members 15 and 17, and thus exerts a greatly increased force for clamping the battery 14 securely in place in the carrier.

It is to be observed that the supporting members 12 and 13 are in the form of angle irons and are provided with horizontally extending flanges of sufficient size to contact with the tops of the sides of the battery 14. Variations in width of the battery 14 may be accommodated by variations in the size of the said horizontally extending flanges.

It also is to be observed that the ends of the battery 14 may be permitted to extend beyond the ends of the carrier without affecting the operativeness of the device. Thus, one such carrier may be used with a variety of differing sizes of batteries.

When it is desired to service the battery held in the carrier, the bolts 21 are unscrewed from the members 20. This permits the battery 14 to drop down to the position shown in Fig. 4, in which position it may be serviced in the carrier or, if desired, may be readily removed from the carrier.

The effective length of the screw threads 24 of the bolts 21 in permitting a lowering of the battery 14 is so increased by the interconnected members 15 and 17 that the travel of the battery 14 is much greater than the length of movement of the bolts 21 relative to the members 20 on the screw threads 24. In the particular embodiment of my invention here shown, the battery is raised or lowered 4 inches during the movement of the bolt 21 for a distance of 1 inch relative to the member 19. In this manner the raising or lowering of the battery 14 is greatly facilitated.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States is.

I claim:

1. A battery carrier adapted to accommodate a plurality of sizes of batteries and including a plurality of extensible and retractable members secured at one end to supporting means and forming the sides of said carrier, a bottom plate secured to said members at the opposite end thereof, a portion of said supporting means being adapted to contact the top portion of a battery carried therein when the carrier is in its raised position, and means cooperating with said bottom plate and said extensible and retractable members for raising and lowering the bottom plate of said carrier relative to said supporting means.

2. A battery carrier adapted to accommodate a plurality of sizes of batteries and including a plurality of extensible and retractable members secured at the one end to supporting means and forming the sides of said carrier, a bottom plate secured to said members at the opposite end thereof, a portion of said supporting means being adapted to contact the top portion of a battery carried therein when the carrier is in its raised position, means cooperating with said bottom plate and said extensible and retractable members for raising and lowering the bottom plate of said carrier relative to said supporting means, and including a bolt secured to each of the extensible and retractable sides of said carrier and extending through said bottom plate, and means secured to said bolt and contacting with said bottom plate and adapted to regulate the extension and retraction of said extensible and retractable members.

3. A battery carrier for motor vehicles, including a plurality of supporting members secured to the frame of a motor vehicle, a portion of said supporting means being adapted to contact the top of a battery held in said carrier, means for suspending a battery from said plurality of supporting members and including a bottom plate, extensible and retractable side members operatively connected with said bottom plate and secured to said supporting members, and means controlling the extension and retraction of said side members and exerting a clamping action on a battery in said carrier between the said supporting members and the said bottom plate when the bottom plate is in its raised position relative to said supporting members.

4. A battery carrier for motor vehicles, including a plurality of supporting members secured to the frame of a motor vehicle, a portion of said supporting means being adapted to contact the top of a battery held in said carrier, means for suspending a battery from said plurality of supporting members and including a bottom plate, and extensible and retractable side members operatively connected with said bottom plate and secured to said supporting members, and means secured to said extensible and retractable side members and adapted to cooperate with said bottom plate to exert a clamping action on a battery in said carrier between the said supporting members and the said bottom plate when the bottom plate is in its raised position relative to said supporting members.

5. A battery carrier for motor vehicles, including a plurality of supporting members secured to the frame of a motor vehicle, means for suspending a battery from said plurality of supporting members and including a bottom plate, and extensible and retractable side members operatively connected with said bottom plate and secured to said supporting members, and means for clamping a battery in said carrier and including means secured to said side members and cooperating with said bottom plate to raise a battery held therein to a point of contact with said supporting members, and means secured to said supporting members and adapted to engage the tops of the sides of a battery whereby the battery is securely held in place by the clamping action of said bottom plate and said means secured to said supporting means.

6. A battery carrier including a supporting member secured to the frame of a vehicle, a bottom plate, lazy tongs secured to said supporting frame and said bottom plate, adjustable means secured to said lazy tongs and extending through said bottom plate and controlling the extension and retraction of the said lazy tongs and the relative movement of said bottom plate relative to said supporting member, the said adjustable means cooperating with the said lazy tongs to exert a clamping action on a battery between said bottom plate and said supporting members when the said bottom plate is in the raised position relative to said supporting members.

HELMER G. CHRISTENSON.